(12) United States Patent
Hori et al.

(10) Patent No.: US 8,975,204 B2
(45) Date of Patent: *Mar. 10, 2015

(54) EXHAUST-GAS-PURIFYING CATALYST

(75) Inventors: Asuka Hori, Kakegawa (JP); Keiichi Narita, Kakegawa (JP); Akimasa Hirai, Kakegawa (JP)

(73) Assignee: Cataler Corporation, Shizuoka (JP)

( * ) Notice: Subject to any disclaimer, the term of this patent is extended or adjusted under 35 U.S.C. 154(b) by 789 days.

This patent is subject to a terminal disclaimer.

(21) Appl. No.: 11/665,973

(22) PCT Filed: Oct. 28, 2004

(86) PCT No.: PCT/JP2004/016449
§ 371 (c)(1),
(2), (4) Date: Apr. 23, 2007

(87) PCT Pub. No.: WO2006/046316
PCT Pub. Date: May 4, 2006

(65) Prior Publication Data
US 2008/0096759 A1    Apr. 24, 2008

(51) Int. Cl.
*B01J 23/00* (2006.01)
*B01J 23/10* (2006.01)
(Continued)

(52) U.S. Cl.
CPC ............... *B01D 53/945* (2013.01); *B01J 23/63* (2013.01); *B01J 37/0244* (2013.01);
(Continued)

(58) Field of Classification Search
USPC ................................. 502/300–355
See application file for complete search history.

(56) References Cited

U.S. PATENT DOCUMENTS

| 5,147,842 A | 9/1992 | Funabiki et al. |
| 5,232,890 A | 8/1993 | Ganguli et al. |

(Continued)

FOREIGN PATENT DOCUMENTS

| EP | 1 046 423 A2 | 10/2000 |
| EP | 1 457 249 A1 | 9/2004 |

(Continued)

OTHER PUBLICATIONS

Oct. 31, 2011 European Office Action in corresponding Appln. No. 04 793 369.2.

*Primary Examiner* — Anthony J Zimmer
(74) *Attorney, Agent, or Firm* — Oliff PLC

(57) ABSTRACT

The present invention relates to a catalyst for purifying exhaust gases emitted from the internal combustion engines. The exhaust-gas-purifying catalyst in this invention, comprising: a catalyst support substrate and a plurality of catalyst layers formed on a surface of the catalyst support substrate and having an exterior-surface layer for forming a surface of the plural catalyst layers, and the exterior-surface layer including a loading layer formed by fireproof inorganic oxide; at least one catalytic metal selected from the group consisting of platinum, palladium and rhodium, and supported on the loading layer; stabilized zirconia loaded on the loading layer; and cerium-zirconium composite oxide loaded on the loading layer, and the stabilized zirconia including zirconia and oxide formed by at least one additive member selected from the group consisting of yttrium, neodymium, praseodymium and lanthanum. The durability of the exhaust-gas-purifying catalyst was improved by having the stabilized zirconia and cerium-zirconium composite oxide in the exterior-surface layer.

7 Claims, 5 Drawing Sheets

(51) Int. Cl.
  *B01D 53/94* (2006.01)
  *B01J 23/63* (2006.01)
  *B01J 37/02* (2006.01)

(52) U.S. Cl.
  CPC .... *B01D 2255/206* (2013.01); *B01D 2255/407* (2013.01); *B01D 2255/902* (2013.01); *F01N 2510/06* (2013.01); *F01N 2510/0684* (2013.01); *Y02T 10/22* (2013.01)
  USPC ............ 502/304; 502/302; 502/325; 502/349

(56) References Cited

U.S. PATENT DOCUMENTS

| | | | |
|---|---|---|---|
| 6,228,799 B1 | 5/2001 | Aubert et al. | |
| 6,294,140 B1* | 9/2001 | Mussmann et al. | 423/213.5 |
| 6,348,430 B1* | 2/2002 | Lindner et al. | 502/304 |
| 6,464,946 B1* | 10/2002 | Yamada et al. | 422/177 |
| 6,806,225 B1* | 10/2004 | Ikeda et al. | 502/326 |
| 7,276,212 B2* | 10/2007 | Hu et al. | 422/177 |
| 2001/0046941 A1* | 11/2001 | Mussmann et al. | 502/304 |
| 2003/0083193 A1* | 5/2003 | Takaya et al. | 502/304 |
| 2003/0207759 A1* | 11/2003 | Nakamura et al. | 502/304 |
| 2004/0028589 A1* | 2/2004 | Reisinger et al. | 423/240 S |
| 2004/0180782 A1* | 9/2004 | Shirahata | 502/304 |
| 2005/0014638 A1* | 1/2005 | Miura | 502/304 |

FOREIGN PATENT DOCUMENTS

| | | |
|---|---|---|
| EP | 1 757 366 A2 | 2/2007 |
| EP | 1 977 819 A2 | 10/2008 |
| JP | A 63-240947 | 10/1988 |
| JP | A 4-284847 | 10/1992 |
| JP | A 7-060118 | 3/1995 |
| JP | A 9-010585 | 1/1997 |
| JP | A 10-296085 | 11/1998 |
| WO | WO 90/14887 | 12/1990 |
| WO | WO 98/24535 | 6/1998 |
| WO | WO 99/56853 | 11/1999 |
| WO | WO 0222241 A1 * | 3/2002 |
| WO | WO 02/083301 A2 | 10/2002 |

* cited by examiner

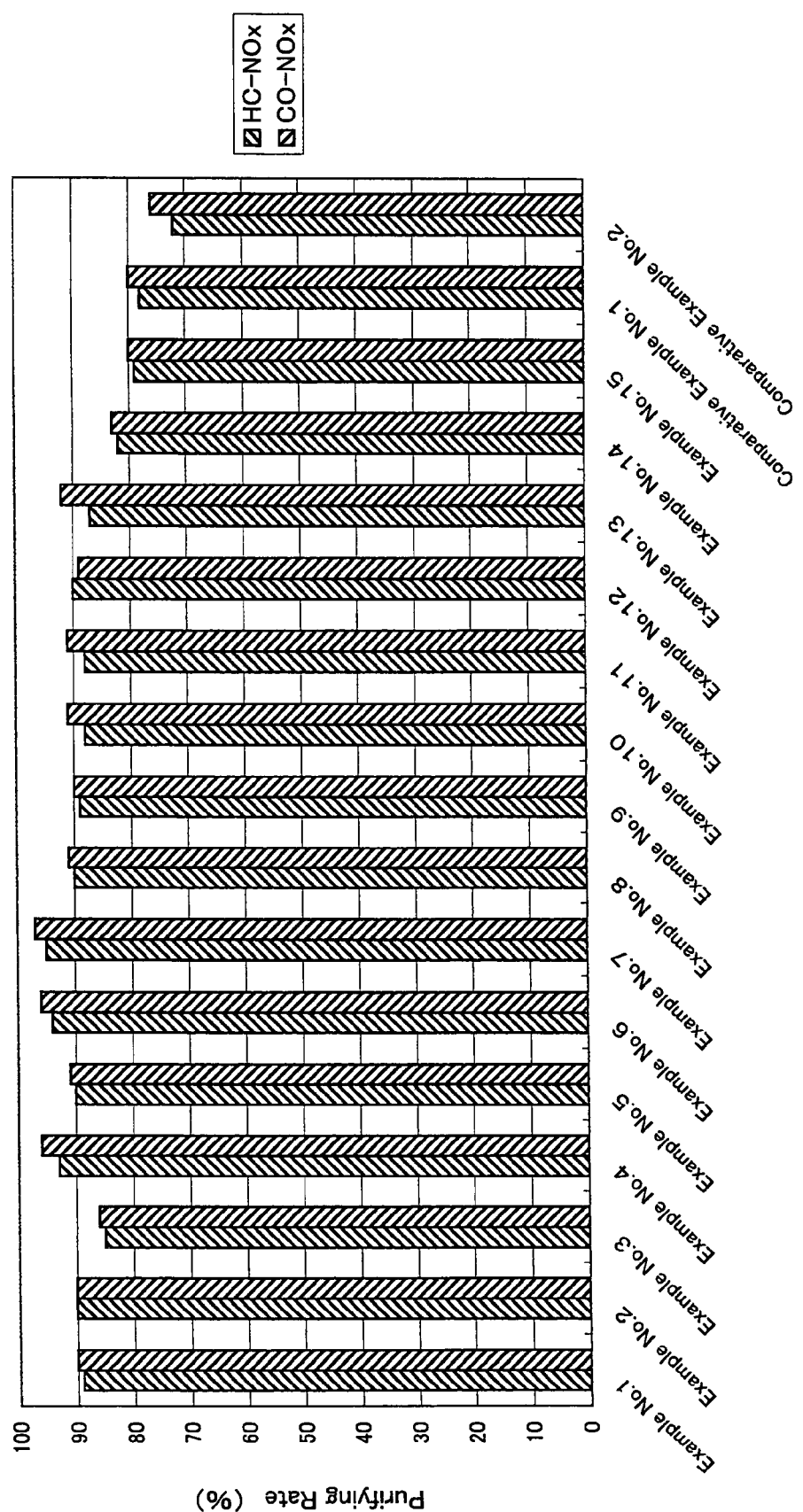

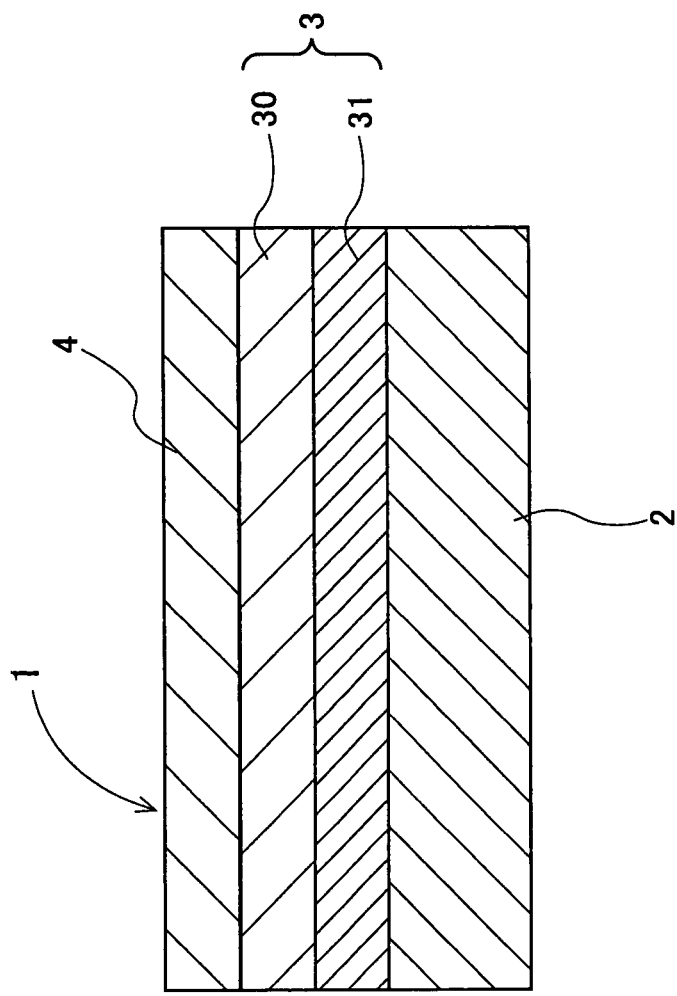

US 8,975,204 B2

EXHAUST-GAS-PURIFYING CATALYST

TECHNICAL FIELD

The present invention relates to a catalyst for purifying exhaust gases emitted from the internal combustion engines.

BACKGROUND ART

The exhaust gases emitted from internal combustion engines of vehicle, such as automobiles, have been purified by the exhaust-gas-purifying catalysts. Nowadays, in the exhaust-gas-purifying catalysts, ternary catalyst components have been mainly used to simultaneously remove hydrocarbons (HC), carbon monoxides (CO) and nitrogen oxides ($NO_x$) included in the exhaust gases.

As for an exhaust-gas-purifying catalyst with a ternary catalyst component, it is common firstly to form a loading layer that is formed by fireproof inorganic oxides such as alumina, ceria-zirconia and the like on a surface of a catalyst support substrate, which is composed of a honeycomb substrate formed by cordierite or metals; and secondly to support platinum, palladium, rhodium and the like on the loading layer.

For example, one of the exhaust-gas-purifying catalysts described above, has been disclosed in Japanese Unexamined Patent Publication (KOKAI) No. 10-296085. The exhaust-gas-purifying catalyst disclosed in the Japanese Unexamined Patent Publication (KOKAI) No. 10-296085, is characterized by a catalyst support substrate, on which two or more of the catalyst-coating layers are formed. The upper layer (surface) of the catalyst-coating layers includes: a fireproof inorganic oxide which is mainly composed of activated alumina; at least one additive member or more selected from the group consisting of cerium, zirconium or their compounds; and rhodium. The lower layer of the catalyst-coating layers includes: a fireproof inorganic oxide which is mainly composed of activated alumina; cerium; zirconium; palladium and barium.

However, the exhaust-gas-purifying catalyst mentioned above has a problem in that, the catalytic metal becomes inactivated because of the growth of the particle size or the occurring of the solid solution in the case that the catalytic metals are exposed to high temperature during the time of purifying the exhaust gases.

DISCLOSURE OF THE INVENTION

The present invention has been made in view of the aforementioned circumstance, and to provide an exhaust-gas-purifying catalyst that is more durable.

The inventors of the present invention inquired into catalysts over and over again. As a result, they have found the solution to the problems mentioned above by simultaneously loading zirconia and cerium-zirconium composite oxide together on one catalyst layer together simultaneously.

The exhaust-gas-purifying catalyst in this invention, comprises: a catalyst support substrate and a plurality of catalyst layers formed on a surface of the catalyst support substrate and having an exterior-surface layer for forming a surface of the plural catalyst layers, where the exterior-surface layer includes a loading layer formed by fireproof inorganic oxide; at least one catalytic metal selected from the group consisting of platinum, palladium and rhodium, and supported on the loading layer; stabilized zirconia loaded on the loading layer; and cerium-zirconium composite oxide loaded on the loading layer, where the stabilized zirconia includes zirconia and an oxide formed by at least one additive member selected from the group consisting of yttrium, neodymium, praseodymium and lanthanum.

The amount of the cerium-zirconium composite oxide may fall in a range of from 5 to 95% by weight where the cerium-zirconium composite oxide and the stabilized zirconium loaded on the loading layer is taken as 100% by weight.

The stabilized zirconia may contain the oxide formed by at least one additive member in an amount of from 1 to 50% by weight where the stabilized zirconia is taken as 100% by weight.

The cerium-zirconium composite oxide may include at least one additive member selected from the group consisting of yttrium, neodymium, praseodymium and lanthanum.

At least one layer within the plural catalyst layers may include at least one compound selected from the group consisting of calcium, strontium, barium and lanthanum.

BRIEF DESCRIPTION OF THE DRAWINGS

FIG. 4 is a graph for showing the measurement result of Cross-Purifying Rate of the exhaust-gas-purifying catalyst in both Examples and Comparative Examples.

FIG. 5 is a cross-sectional view for illustrating the structure of the exhaust-gas-purifying catalyst in Example No. 16.

BEST MODE FOR CARRYING OUT THE INVENTION

Figure 1:
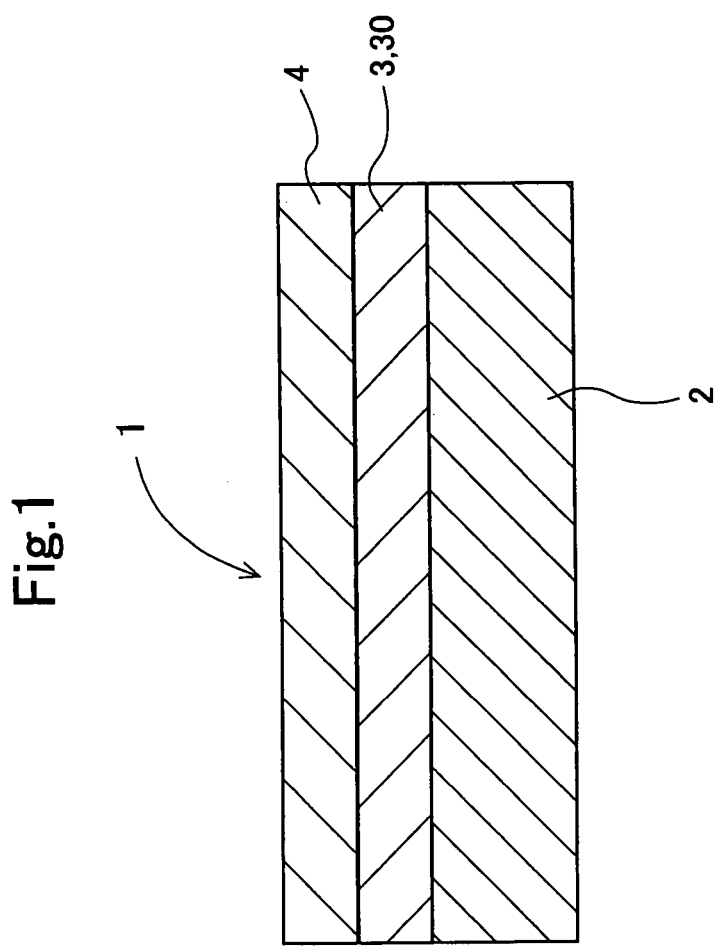
FIG. 1 is a cross-sectional view for illustrating the structure of the exhaust-gas-purifying catalyst in Example No. 1.

Hereinafter, according to said invention, further concretized inventions and the embodiment modes of these inventions will be described as follows.

Mode for Carrying Out the Invention

The exhaust-gas-purifying catalyst of the present invention comprises a catalyst support substrate and a plurality of catalyst layers. The catalyst layer in this invention refers to the layer portion which is able to improve the properties of the exhaust-gas-purifying catalyst. In other words, the catalyst layer can have a structure to purify the exhaust gases; meanwhile, the catalyst layer can also have a structure to improve the purifying ability through the reaction with other catalyst layers without catalytic metal.

The catalyst layer is formed on the surface of the catalyst support substrate. The catalyst support substrate is formed by fireproof materials. Moreover, the catalyst support substrate can be the ones used in conventional exhaust-gas-purifying catalysts. For example, it is possible to use a monolithic honeycomb substrate, which is made of the metals such as the stainless or the fireproof ceramics such as cordierite.

The exterior-surface layer for forming a surface of the plurality of catalyst layers includes: a loading layer formed by fireproof inorganic oxides; at least one catalytic metal selected from the group consisting of platinum, palladium and rhodium that is supported on the loading layer; a stabilized zirconia loaded on the loading layer; and a cerium-zirconium composite oxide loaded on the loading layer.

The fireproof inorganic oxides for forming the loading layer of the exterior-surface layer, can be the ones that are used in the conventional exhaust-gas-purifying catalysts. For example, alumina, ceria, zirconia and the like can be used.

The stabilized zirconia loaded on the loading layer of the exterior-surface layer is able to stabilize the catalytic metals that are supported on the same loading layer. Concretely, the growth of the particle size of the catalytic metal is restrained by the stabilized zirconia.

The stabilized zirconia comprises zirconia and oxide which is formed by at least one additive member selected from the group consisting of yttrium, neodymium, praseodymium and lanthanum. The stabilized zirconia contains at least one oxide within zirconia. By containing at least one oxide within zirconia, the stabilized zirconia becomes capable of having a widely stable range of none-transferring with respect to the temperature change, and becomes fireproof.

The stabilized zirconia may contain the oxide formed by at least one additive member in an amount of from 1 to 50% by weight where the stabilized zirconia is taken as 100% by weight. Here, the oxide formed by at least one additive member refers to the oxide formed by at least one additive member selected from the group consisting of yttrium, neodymium, praseodymium and lanthanum. When the amount of the oxide is lower than 1% by weight, zirconia becomes incapable of stabilizing, lacks heat resistance, or is incapable of restraining the deterioration of the second catalytic metal. On the other hand, when the amount of the oxide is higher than 50% by weight, the amount of the oxide (the oxide formed by at least one additive member) becomes surplus, and zirconia decreases in amount se such that it is hard to restrain the deterioration of the catalytic metal of zirconia. It is further preferable that the amount of the oxide mentioned above falls in a range of from 10 to 40% by weight where the stabilized zirconia is taken as 100% by weight.

The cerium-zirconium composite oxide is loaded on the loading layer of the exterior-surface layer. The cerium-zirconium composite oxide has advantageous oxygen-storage ability of oxygen adsorption or oxygen desorption. Moreover, its oxygen-storage ability is also efficient in a high temperature region by loading the cerium-zirconium composite oxide on the catalyst layer in a state of composite oxide. However, the oxygen-storage ability becomes inefficient due to the growth of the particles in size under a high temperature condition, when it is loaded on the catalyst layers in a state of cerium oxide.

The amount of the cerium-zirconium composite oxide may fall in a range of from 5 to 95% by weight in the exterior-surface layer where the cerium-zirconium composite oxide and the stabilized zirconia loaded on the loading layer of the exterior-surface layer is taken as 100% by weight. It is difficult to obtain an effect through the addition of cerium due to an extreme lack of cerium when the amount of the cerium-zirconium composite oxide is less than 5% by weight. Meanwhile, it is also difficult to obtain the effect through the addition of zirconia due to the surplus of the cerium-zirconium composite oxide when the amount of the cerium-zirconium composite oxide is greater than 95% by weight.

It is preferable that, the ratio of the ceria to the zirconia by weight in the cerium-zirconium composite oxides falls in a range of from 10:90 to 90:10.

The cerium-zirconium composite oxides can include at least one additive member selected from the group consisting of yttrium, neodymium, praseodymium and lanthanum.

At least one layer within the plurality of catalyst layers can include at least one compound selected from the group consisting of calcium, strontium, barium and lanthanum. The catalyst layer is capable of improving its purifying properties and the purifying properties of the exhaust-gas-purifying catalyst, by including at least one selected compound in at least one layer of the plurality of catalyst layers. For example, by including barium, it becomes possible to improve the purification rate of NOx in a region of high level of fuel concentration, such as in a case where the Air-Fuel Ratio (A/F) is lower than 14.

The composition of the interior layer formed under the exterior-surface layer within the plurality of catalyst layers is not limited particularly. That is, the interior layer can be either a single layer or a plurality of layers. Moreover, the catalyst layer for forming the interior layer can either include the catalytic metal or not.

The interior layer can have a catalyst layer formed by fireproof inorganic oxide and/or adsorption material. Moreover, the interior layer can have a catalyst layer comprising a loading layer formed by fireproof inorganic oxide and/or adsorption material, and a catalytic metal which is supported on the loading layer. Furthermore, the interior layer may be composed of one catalyst layer or more. That means: the interior layer can have a plurality of catalyst layers excluding catalytic metal; or the interior layer can have a plurality of catalyst layers including catalytic metal; or the interior layer can have a combination of the above-mentioned plurality of catalyst layers. In other words, it is preferable that, the interior layer may be located under the exterior-surface layer within a plurality of catalyst layers that may be comprised of one catalyst layer or more, and that the catalyst layer/layers is/are formed by fireproof inorganic oxide and/or adsorption material or having a loading layer formed by fireproof inorganic oxide and/or adsorption material, on which the catalytic metal is supported.

Regarding the fireproof inorganic oxides for forming the interior layer, it is possible to use the same as the one employed in the conventional exhaust-gas-purifying catalysts. For example, they can be alumina, ceria, zirconia and so on.

Moreover, regarding the adsorption materials for forming the interior layer, it is possible to use the same as the ones employed in the conventional exhaust-gas purifying catalysts. For example, it can be zeolite.

Regarding the catalytic metals for forming the interior layer, it is possible to use the same as the ones employed in the conventional exhaust-gas-purifying catalysts. For example, it is possible to use at least one catalytic metal selected from the group consisting of platinum, palladium and rhodium.

EXAMPLES

Hereinafter, the present invention will be described by using examples.

As the examples for the present invention, an exhaust-gas-purifying catalyst having a two-layer catalyst layer was produced, and the two-layer catalyst layer was composed of an exterior-surface layer and an interior layer formed on a surface of a monolithic honeycomb substrate. Note that, the monolithic honeycomb substrate used in the production of the exhaust-gas-purifying catalyst in the examples had an apparent volume of 1.0 L, and it was formed by cordierite.

Example No. 1

First of all, an activated alumina powder supporting palladium, cerium-zirconium composite oxide powder, barium sulfate powder and alumina hydrate were put into the water together and stirred. Then the resulting mixture was prepared to be a uniformly dispersed slurry.

The prepared slurry was coated on the surface of the monolithic honeycomb substrate and dried. After that, it was heated at 250 degrees centigrade for one hour.

In accordance with the above-described procedures, the catalyst layer of the interior layer was formed on the surface of the monolithic honeycomb substrate. The interior layer had a structure of carrying cerium-zirconium composite oxides, barium and palladium on the loading layer which was formed by alumina. The palladium was supported in an amount of 2.0 g per 1 L of the apparent volume of the exhaust-gas-purifying catalyst.

A weight of 25 g cerium-zirconium composite oxide of which the ratio of cerium to zirconium was taken as 60:40 by weight, a weight of 25 g stabilized zirconia powder of which the ratio of zirconia ($ZrO_2$) to $La_2O_3$ was taken as 90:10 by weight, a weight of 20 g barium sulfate powder, a weight of 50 g activated alumina powder, nitrate rhodium and alumina hydrate were put into the water together and stirred. Then the mixture of them was prepared to be a uniformly dispersed slurry.

The prepared slurry was coated on the surface of the interior layer and dried. After that, it was heated at 250 degrees centigrade for one hour.

In accordance with the above-described procedures, the catalyst layer of the exterior-surface layer was formed on the surface of the interior layer. The exterior-surface layer had a structure of carrying cerium-zirconium composite oxide, stabilized zirconia, barium and rhodium on the loading layer formed by alumina. The rhodium was supported in an amount of 0.5 g per 1 L of the apparent volume of the exhaust-gas-purifying catalyst. Note that, the containing ratio of the cerium-zirconium composite oxide to the summed amount of the cerium-zirconium composite oxide and the stabilized zirconia in the exterior-surface layer was taken as 50% by weight. Moreover, the oxide of lanthanum was contained in an amount of 10% by weight in the stabilized zirconia when the entire stabilized zirconia was taken as 100% by weight.

The exhaust-gas-purifying catalyst of the present example was produced by the method above.

The exhaust-gas-purifying catalyst 1 in the present example was composed of: a monolithic honeycomb substrate 2; an interior layer 3 and 30 formed on the surface of the monolithic honeycomb substrate 2; and an exterior-surface layer 4 formed on the surface of the interior layer 3 and 30. The interior layer 3 and 30 had a structure of carrying cerium-zirconium composite oxide, barium and palladium on a loading layer which was formed by alumina. And, the exterior-surface layer 4 resulting in having a structure of carrying cerium-zirconium composite oxide, stabilized zirconia, barium and rhodium on a loading layer which was formed by alumina. The structure of the catalyst layers 3 and 4 laminated in the exhaust-gas-purifying catalyst of this example was demonstrated in FIG. 1.

Example No. 2

Except that the stabilized zirconia powder was composed of $ZrO_2$, $Nd_2O_3$ and $La_2O_3$, and the ratio of those oxides was taken as 90:5:5 by weight, the exhaust-gas-purifying catalyst was produced in the same manner as that of Example No. 1.

Except for the difference in stabilized zirconia, the exhaust-gas-purifying catalyst of this example was similar to that of Example No. 1. Note that, the containing ratio of the cerium-zirconium composite oxide to the summed amount of the cerium-zirconium composite oxide and the stabilized zirconia in the exterior-surface layer was taken as 50% by weight. Moreover, the oxides of lanthanum and neodymium were contained respectively in an amount of 5% by weight in the stabilized zirconia, when the entire stabilized zirconia was taken as 100% by weight.

Example No. 3

Except that the stabilized zirconia powder was composed of $ZrO_2$ and $Nd_2O_3$ at a ratio of 95:5 by weight, the exhaust-gas-purifying catalyst was produced in the same manner as that of Example No. 1.

Except for the difference in stabilized zirconia, the exhaust-gas-purifying catalyst of this example was similar to that of Example No. 1. Note that, the containing ratio of the cerium-zirconium composite oxide to the summed amount of the cerium-zirconium composite oxide and the stabilized zirconia in the exterior-surface layer was taken as 50% by weight. Moreover, the oxide of neodymium was contained in an amount of 5% by weight in the stabilized zirconia, when the entire stabilized zirconia was taken as 100% by weight.

Example No. 4

Except that the stabilized zirconia powder was composed of $ZrO_2$ and $Pr_6O_{11}$ at a ratio of 90:10 by weight, the exhaust-gas-purifying catalyst was produced in the same manner as that of Example No. 1.

Except for the difference in stabilized zirconia, the exhaust-gas-purifying catalyst of this example was similar to that of Example No. 1. Note that, the containing ratio of the cerium-zirconium composite oxide to the summed amount of the cerium-zirconium composite oxide and the stabilized zirconia in the exterior-surface layer was taken as 50% by weight. Moreover, the oxide of praseodymium was contained in an amount of 10% by weight in the stabilized zirconia, when the entire stabilized zirconia was taken as 100% by weight.

Example No. 5

Except that the stabilized zirconia powder was composed of $ZrO_2$, $Nd_2O_3$ and $Y_2O_3$, and the ratio of those oxides was taken as 90:5:5 by weight, the exhaust-gas-purifying catalyst was produced in the same manner as that of Example No. 1.

Except for the difference in stabilized zirconia, the exhaust-gas-purifying catalyst of this example was similar to that of Example No. 1. Note that, the containing ratio of the cerium-zirconium composite oxide to the summed amount of the cerium-zirconium composite oxide and the stabilized zirconia in the exterior-surface layer was taken as 50% by weight. Moreover, the oxides of neodymium and yttrium were contained respectively in an amount of 5% by weight in the stabilized zirconia, when the entire stabilized zirconia was taken as 100% by weight.

Example No. 6

Except that the stabilized zirconia powder was composed of $ZrO_2$ and $Pr_6O_{11}$ at a ratio of 80:20 by weight, the exhaust-gas-purifying catalyst was produced in the same manner as that of Example No. 1.

Except for the difference in stabilized zirconia, the exhaust-gas-purifying catalyst of this example was similar to that of Example No. 1. Note that, the containing ratio of the cerium-zirconium composite oxide to the summed amount of the cerium-zirconium composite oxide and the stabilized zirconia in the exterior-surface layer was taken as 50% by weight. Moreover, the oxide of praseodymium was contained in an amount of 20% by weight in the stabilized zirconia, when the entire stabilized zirconia was taken as 100% by weight.

Example No. 7

Except that the stabilized zirconia powder was composed of $ZrO_2$ and $Pr_6O_{11}$ at a ratio of 60:40 by weight, the exhaust-gas-purifying catalyst was produced in the same manner as that of Example No. 1.

Except for the difference in stabilized zirconia, the exhaust-gas-purifying catalyst of this example was similar to that of Example No. 1. Note that, the containing ratio of the cerium-zirconium composite oxide to the summed amount of the cerium-zirconium composite oxide and the stabilized zirconia in the exterior-surface layer was taken as 50% by weight. Moreover, the oxide of praseodymium was contained in an amount of 40% by weight in the stabilized zirconia, when the entire stabilized zirconia was taken as 100% by weight.

Example No. 8

Except that the stabilized zirconia powder was composed of $ZrO_2$, $Pr_6O_{11}$ and $La_2O_3$, and the ratio of those oxides was taken as 80:10:10 by weight, the exhaust-gas-purifying catalyst was produced in the same manner as that of Example No. 1.

Except for the difference in stabilized zirconia, the exhaust-gas-purifying catalyst of this example was similar to that of Example No. 1. Note that, the containing ratio of the cerium-zirconium composite oxide to the summed amount of the cerium-zirconium composite oxide and the stabilized zirconia in the exterior-surface layer was taken as 50% by weight. Moreover, the oxides of praseodymium and lanthanum were contained respectively in an amount of 10% by weight in the stabilized zirconia, when the entire stabilized zirconia was taken as 100% by weight.

Example No. 9

First of all, the interior layer was formed on the surface of the monolithic honeycomb substrate in the same manner as that of Example No. 1.

A weight of 10 g cerium-zirconium composite oxide powder, a weight of 40 g stabilized zirconia powder, a weight of 20 g sulfate barium powder, a weight of 50 g activated alumina powder, nitrate rhodium and alumina hydrate were put into the water together and stirred. Then the mixture of those powders was prepared to be a uniformly dispersed slurry. Note that, the materials used in the production of the slurry were similar to the ones that were used to form the exterior-surface layer in Example No. 1.

The prepared slurry was coated and dried on the surface of the interior layer formed on the monolithic honeycomb substrate. After that, it was heated at 250 degrees centigrade for one hour.

In accordance with the above-described procedures, the exterior-surface layer was formed on the surface of the interior layer. The rhodium was supported in the exterior-surface layer in an amount of 0.5 g per 1 L of the apparent volume of the exhaust-gas-purifying catalyst. Note that, the containing ratio of the cerium-zirconium composite oxide to the summed amount of the cerium-zirconium composite oxide and the stabilized zirconia in the exterior-surface layer was taken as 20% by weight. Moreover, the oxide of lanthanum was contained in an amount of 10% by weight in the stabilized zirconia, when the entire stabilized zirconia was taken as 100% by weight.

The exhaust-gas-purifying catalyst of the present example was produced by the method above.

Except for the differences in the amount of cerium-zirconium composite oxide and the amount of stabilized zirconia in the exterior-surface layer, the exhaust-gas-purifying catalyst of this example was similar to that of Example No. 1.

Example No. 10

First of all, the interior layer was formed on the surface of the monolithic honeycomb substrate in the same manner as that of Example No. 1.

A weight of 40 g cerium-zirconium composite oxide powder, a weight of 10 g stabilized zirconia powder, a weight of 20 g sulfate barium powder, a weight of 50 g activated alumina powder, nitrate rhodium and alumina hydrate were put into the water together and stirred. Then the mixture of those powders was prepared to be a uniformly dispersed slurry. Note that, the materials used in the production of the slurry were similar to the ones that were used to form the exterior-surface layer in Example No. 5.

The prepared slurry was coated and dried on the surface of the interior layer formed on the monolithic honeycomb substrate. After that, it was heated at 250 degrees centigrade for one hour.

In accordance with the above-described procedures, the exterior-surface layer was formed on the surface of the interior layer. The rhodium was supported in the exterior-surface layer in an amount of 0.5 g per 1 L of the apparent volume of the exhaust-gas-purifying catalyst. Note that, the containing ratio of the cerium-zirconium composite oxide to the summed amount of the cerium-zirconium composite oxide and the stabilized zirconia in the exterior-surface layer was taken as 80% by weight. Moreover, the oxide of lanthanum was contained in an amount of 10% by weight in the stabilized zirconia, when the entire stabilized zirconia was taken as 100% by weight.

The exhaust-gas-purifying catalyst of the present example was produced by the method above.

Except for the differences in the amount of cerium-zirconium composite oxide and the amount of stabilized zirconia in the exterior-surface layer, the exhaust-gas-purifying catalyst of this example was similar to that of Example No. 5.

Example No. 11

Except that the cerium and the zirconium contained in the cerium-zirconium composite oxide powder were taken by a ratio of 80:20 by weight, the exhaust-gas-purifying catalyst was produced in the same manner as that of Example No. 1.

Except for the difference in the cerium-zirconium composite oxide, the exhaust-gas-purifying catalyst of this example was similar to that of Example No. 1. Note that, the containing ratio of the cerium-zirconium composite oxide to the summed amount of the cerium-zirconium composite oxide and the stabilized zirconia in the exterior-surface layer was taken as 50% by weight. Moreover, the oxide of lanthanum was contained in an amount of 10% by weight in the stabilized zirconia, when the entire stabilized zirconia was taken as 100% by weight.

Example No. 12

Except that the cerium and the zirconium contained in the cerium-zirconium composite oxide powder were taken by a ratio of 20:80 by weight, the exhaust-gas-purifying catalyst was produced in the same manner as that of Example No. 1.

Except for the difference in the cerium-zirconium composite oxide, the exhaust-gas-purifying catalyst of this example was similar to that of Example No. 1. Note that, the containing ratio of the cerium-zirconium composite oxide to the summed amount of the cerium-zirconium composite oxide and the stabilized zirconia in the exterior-surface layer was taken as 50% by weight. Moreover, the oxide of lanthanum was contained in an amount of 10% by weight in the stabilized zirconia, when the entire stabilized zirconia was taken as 100% by weight.

Example No. 13

First of all, the interior layer was formed in the same manner as that of Example No. 1 in order to supporting palladium in an amount of 1.0 g per 1 L of the apparent volume.

The interior layer had a structure of carrying cerium-zirconium composite oxide, barium and palladium on the loading layers formed by alumina. The palladium was supported in an amount of 1.0 g per 1 L of the apparent volume of the exhaust-gas-purifying catalyst.

A weight of 25 g cerium-zirconium composite oxide powder, a weight of 25 g stabilized zirconia powder, a weight of 20 g sulfate barium powder, a weight of 50 g activated alumina powder, nitrate rhodium, nitrate platinum and alumina hydrate were put into the water together and stirred. Then the mixture of those powders was prepared to be a uniformly dispersed slurry. Note that, the materials used in the production of the slurry were similar to the ones that were used to form the exterior-surface layer in Example No. 1.

The prepared slurry was coated on the surface of the interior layer and dried. After that, it was heated at 250 degrees centigrade for one hour.

In accordance with the above-described procedures, the exterior-surface layer was formed on the surface of the interior layer. The exterior-surface layer had a structure of carrying cerium-zirconium composite oxide, stabilized zirconia, barium, platinum and rhodium on the loading layer which was formed by alumina. The rhodium and platinum were supported respectively in an amount of 0.5 g and 1.0 g per 1 L of the apparent volume of the exhaust-gas-purifying catalyst. Note that, the containing ratio of the cerium-zirconium composite oxide to the summed amount of the cerium-zirconium composite oxide and the stabilized zirconia in the exterior-surface layer was taken as 50% by weight. Moreover, the oxide of lanthanum was contained in an amount of 10% by weight in the stabilized zirconia when the entire stabilized zirconia was taken as 100% by weight.

The exhaust-gas-purifying catalyst of the present example was produced by the method above.

Except for the difference in the supporting amount of the catalytic metals and a further addition of platinum as a catalytic metal, the exhaust-gas-purifying catalyst of this example was similar to that of Example No. 1.

Example No. 14

Except that the stabilized zirconia powder was composed of $ZrO_2$ and $Nd_2O_3$ at a ratio of 100:1 by weight, the exhaust-gas-purifying catalyst was produced in the same manner as that of Example No. 1.

Except for the difference in stabilized zirconia, the exhaust-gas-purifying catalyst of this example was similar to that of Example No. 1. Note that, the containing ratio of the cerium-zirconium composite oxide to the summed amount of the cerium-zirconium composite oxide and the stabilized zirconia in the exterior-surface layer was taken as 50% by weight. Moreover, the oxide of neodymium was contained in an amount of 0.5% by weight in the stabilized zirconia, when the entire stabilized zirconia was taken as 100% by weight.

Example No. 15

Except that the stabilized zirconia powder was composed of $ZrO_2$ and $Pr_6O_{11}$ at a ratio of 100:120 by weight, the exhaust-gas-purifying catalyst was produced in the same manner as that of Example No. 1.

Except for the difference in stabilized zirconia, the exhaust-gas-purifying catalyst of this example was similar to that of Example No. 1. Note that, the containing ratio of the cerium-zirconium composite oxide to the summed amount of the cerium-zirconium composite oxide and the stabilized zirconia in the exterior-surface layer was taken as 50% by weight. Moreover, the oxide of lanthanum was contained in an amount of 60% by weight in the stabilized zirconia, when the entire stabilized zirconia was taken as 100% by weight.

Comparative Example No. 1

First of all, the interior layer was formed on the surface of the monolithic honeycomb substrate in the same manner as that of Example No. 1.

A weight of 50 g cerium-zirconium composite oxide powder, a weight of 20 g sulfate barium powder, a weight of 50 g activated alumina powder on which the rhodium was supported, and alumina hydrate were put into the water together and stirred. Then the mixture of those powders was prepared to be a uniformly dispersed slurry. Note that, the materials used in the production of the slurry were similar to the ones that were used to form the exterior-surface layer in Example No. 1.

The prepared slurry was coated on the surface of the interior layer and dried. After that, it was heated at 250 degrees centigrade for one hour.

In accordance with the above-described procedures, the exterior-surface layer was formed on the surface of the interior layer. The rhodium was supported in an amount of 0.5 g per 1 L of the apparent volume of the exhaust-gas-purifying catalyst in the exterior-surface layer.

The exhaust-gas-purifying catalyst of the present comparative example was produced by the method above.

Except that the exhaust-gas-purifying catalyst of this comparative example did not contain the stabilized zirconia in the exterior-surface layer, and the loading amount of the cerium-zirconium composite oxide and the catalytic metals were different, the exhaust-gas-purifying catalyst of this example was similar to that of Example No. 1.

Comparative Example No. 2

First of all, the interior layer was formed on the surface of the monolithic honeycomb substrate in the same manner as that of Example No. 1.

A weight of 50 g stabilized zirconia powder, a weight of 20 g sulfate barium powder, a weight of 50 g activated alumina powder on which the rhodium was supported, and alumina hydrate were put into the water together and stirred. Then the mixture of those powders was prepared to be a uniformly dispersed slurry. Note that, the materials used in the production of the slurry were similar to the ones which were used to make the exterior-surface layer in Example No. 1.

The prepared slurry was coated on the surface of the interior layer and dried. After that, it was heated at 250 degrees centigrade for one hour.

In accordance with the above-described procedures, the exterior-surface layer was formed on the surface of the interior layer. The rhodium was supported in an amount of 0.5 g per 1 L of the apparent volume of the exhaust-gas-purifying catalyst in the exterior-surface layer.

The exhaust-gas-purifying catalyst of the present comparative example was produced by the method above.

Except that the exhaust-gas-purifying catalyst of this comparative example did not contain the cerium-zirconium composite oxide in the exterior-surface layer, and the loading amount of the stabilized zirconia and the catalytic metals were different, the exhaust-gas-purifying catalyst of this example was similar to that of Example No. 1.

The composition of the exhaust-gas-purifying catalysts in each Examples and each Comparative Examples above was demonstrated in Table 1.

Table 1

Evaluation

As an evaluation test for the exhaust-gas-purifying catalyst, the 50% Purifying Temperature and the Cross-Purifying Rate were examined.

50% Purifying Temperature

First of all, each two of the resulting catalysts of the Examples and the Comparative Examples was set up to a gasoline engine with a volume of 4000 cc, respectively. Under the ageing conditions set forth in FIG. 1, the durability test of 20 hours was carried out at an engine revolution speed of 3500 rpm, an inlet-exhaust-gas temperature of 800 degrees centigrade and a center-part-exhaust-gas temperature of 920 degrees centigrade.

As shown in FIG. 1, the ageing conditions were controlled as programmed such that: every 60 seconds were taken as one cycle, and the first 20 seconds of each one cycle was controlled at a theoretical Air-Fuel Ratio (A/F) of 14.6. Subsequently, the fuel continued increasing until the fifty-sixth second. The A/F was kept at approximately 13 during the time from the twentieth second to the twenty-sixth second. The A/F was kept at 15.5 during the time from the twenty-sixth second to the sixtieth second, and it was continuously controlled. The durability test was carried out such that the temperature of center part of the catalyst in each cycle continued increasing up to 920 degrees centigrade from the twenty-sixth second, and then began decreasing from the fifty-sixth second due to the surplus in oxygen.

Subsequently, each of the catalysts in the durability tests above were set up to the gasoline engine with a volume of 2000 cc, and the catalyst property was evaluated. The evaluation test was carried out at an engine revolution speed of 1400 rpm, a theoretical Air-Fuel Ratio (A/F) of 14.6, and the 50% Purifying Temperature for HC, CO and NOx was calculated by changing the temperature at the inlet of the catalyst.

Cross-Purifying Rate

Each of the catalysts in the durability tests above was set up to a gasoline engine with a volume of 2000 cc, and catalyst properties for each catalyst were evaluated, respectively. The purifying rate for the HC, CO and NOx was calculated by changing the Air-Fuel Ratio (A/F) in a range of from 13 to 16 under the condition that the temperature for the gas streaming to the catalyst was set at 460 degrees centigrade constantly at an engine revolution speed of 3000 rpm. The frequency for the evaluation was set at 1 Hz and $\Delta A/F=1.0$.

Figure 2:
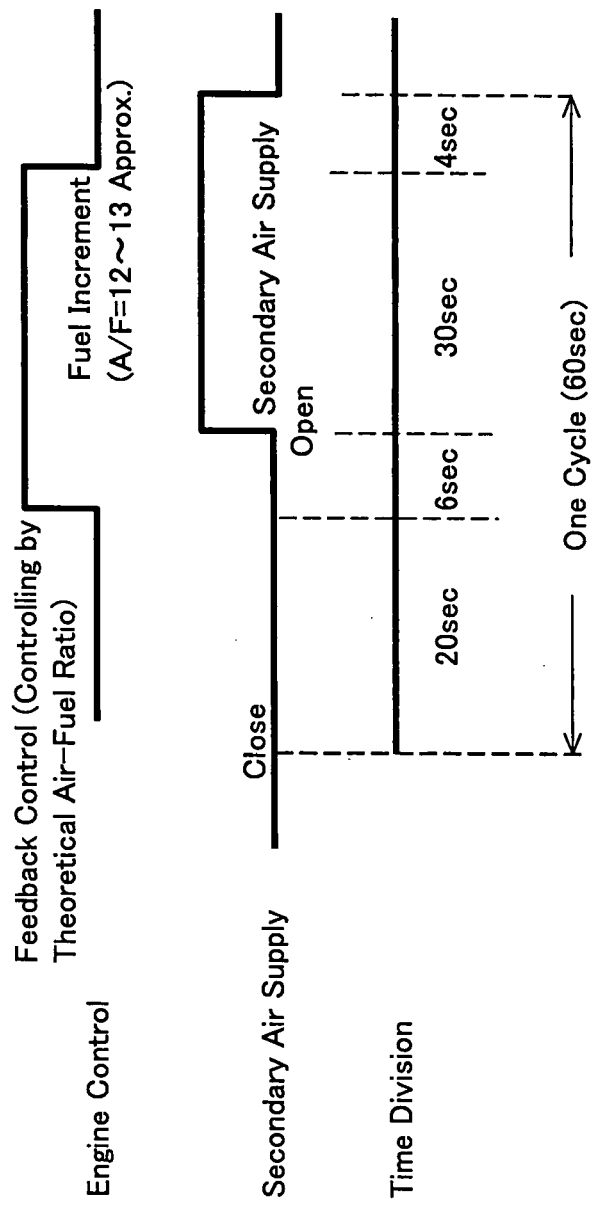
FIG. 2 is a chart for showing the ageing conditions in the test of durability of the exhaust-gas-purifying catalyst in both Examples and Comparative Examples.
Figure 3:
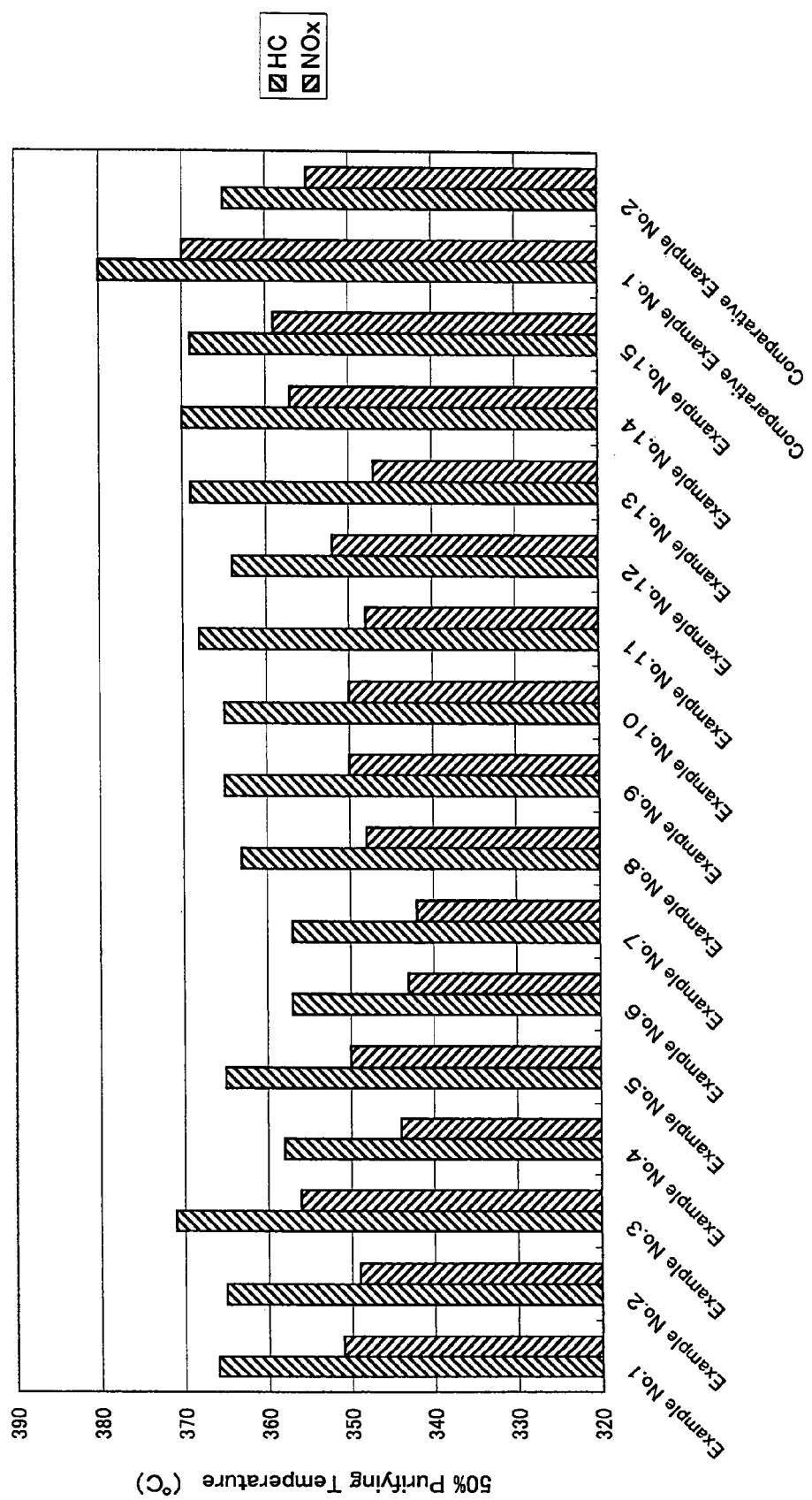
FIG. 3 is a graph for showing the measurement result of 50% Purifying Temperature of the exhaust-gas-purifying catalyst in both Examples and Comparative Examples.

The test results were shown in FIG. 2~3 and Table 2.

Table 2

Based on the results in the FIG. 2~3 and the Table 2, it was found that the exhaust-gas-purifying catalyst of each example demonstrated a low 50% Purifying Temperature and a high Cross-Purifying Rate.

That was to say, the durability of the exhaust-gas-purifying catalyst for each example was improved by loading the stabilized zirconia and cerium-zirconium composite oxide in the exterior-surface layer which is located by the side of surface layer.

Other Examples

In addition to the Examples for the exhaust-gas-purifying catalyst of the present invention as shown above, it is also possible to demonstrate the present invention with other examples was shown below.

Example No. 16

First of all, the activated alumina powder and the alumina hydrate were put into the water together and stirred, then the mixture of them was prepared to be a uniformly dispersed slurry.

The prepared slurry was coated on the surface of the monolithic honeycomb substrate and dried. After that, it was heated at 250 degrees centigrade for one hour.

In accordance with the above-described procedures, the catalyst layer formed by alumina was formed on the surface of the monolithic honeycomb substrate. The catalyst layer formed by alumina was loaded in an amount of 50 g per 1 L of the apparent volume of the exhaust-gas-purifying catalyst.

Subsequently, the interior layer and the exterior-surface layer were formed on the surface of the catalyst layer formed by alumina in the same manner as that of Example No. 1.

The exhaust-gas-purifying catalyst of the present example was produced by the method above.

Except for having a catalyst layer formed by alumina and formed on the surface of the catalyst support substrate further as an interior layer, the exhaust-gas-purifying catalyst of present example was similar to that of the Example No. 1. That is, the exhaust-gas-purifying catalyst 1 of the present example was comprised of: a monolithic honeycomb substrate 2, an interior layer 3 formed on the surface of the monolithic honeycomb substrate 2, and an exterior-surface layer 4 formed on the surface of the interior layer 3. And, the interior layer 3 was comprised of: a catalyst layer 31 formed by alumina and formed on the surface of the monolithic honeycomb substrate 2, and a catalyst layer 30 carrying cerium-zirconium composite oxide, barium and palladium on a loading layer which is formed by alumina and formed on the surface of the catalyst layer 31. The exterior-surface layer 4 had a structure of carrying cerium-zirconium composite oxide, stabilized zirconia, barium and rhodium on the loading layer formed by alumina. The structure of the catalyst layers 3 and 4 laminated in the exhaust-gas-purifying catalyst of this example was demonstrated in FIG. 5.

Example No. 17

First of all, zeolite powder and alumina hydrate were put into the water together and stirred, then the mixture of them was prepared to be a uniformly dispersed slurry.

The prepared slurry was coated on the surface of the monolithic honeycomb substrate and dried. After that, it was heated at 250 degrees centigrade for one hour.

In accordance with the above-described procedures, the catalyst layer formed by zeolite was formed on the surface of the monolithic honeycomb substrate. The catalyst layer formed by zeolite was loaded in an amount of 100 g per 1 L of the apparent volume of the exhaust-gas-purifying catalyst.

Subsequently, the interior layer and the exterior-surface layer were formed on the surface of the catalyst layer which is formed by zeolite in the same manner as that of Example No. 1.

The exhaust-gas-purifying catalyst of the present example was produced by the method above.

Except for having a catalyst layer formed by zeolite and formed on the surface of the catalyst support substrate further as an interior layer, the exhaust-gas-purifying catalyst of present example was similar to that of the Example No. 1. In other words, except for changing the catalyst layer 31 formed by alumina into the one formed by zeolite, it was similar to that of the Example No. 16.

TABLE 1

| | Interior Layer | Exterior-Surface Layer | | | | | |
|---|---|---|---|---|---|---|---|
| | Catalytic Metal | Stabilized Zirconia | | | | Catalytic Metal | |
| | Supporting | | | loading | Cerium-Zirconium Composite Oxide | Supporting | Supporting |
| | Amount of Pd (g/L) | Composition | Ratio by Weight | Amount (g/L) | Ratio by Weight Zirconia:Ceria | loading Amount (g/L) | Amount of Rh (g/L) | Amount of Pt (g/L) |
| Example 1 | 2.0 | $ZrO_2$:$La_2O_3$ | 90:10 | 25 | 60:40 | 25 | 0.5 | |
| Example 2 | 2.0 | $ZrO_2$:$Nd_2O_3$:$La_2O_3$ | 90:5:5 | 25 | 60:40 | 25 | 0.5 | |
| Example 3 | 2.0 | $ZrO_2$:$Nd_2O_3$ | 95:5 | 25 | 60:40 | 25 | 0.5 | |
| Example 4 | 2.0 | $ZrO_2$:$Pr_6O_{11}$ | 90:10 | 25 | 60:40 | 25 | 0.5 | |
| Example 5 | 2.0 | $ZrO_2$:$Nd_2O_3$:$Y_2O_3$ | 90:5:5 | 25 | 60:40 | 25 | 0.5 | |
| Example 6 | 2.0 | $ZrO_2$:$Pr_6O_{11}$ | 80:20 | 25 | 60:40 | 25 | 0.5 | |
| Example 7 | 2.0 | $ZrO_2$:$Pr_6O_{11}$ | 60:40 | 25 | 60:40 | 25 | 0.5 | |
| Example 8 | 2.0 | $ZrO_2$:$Pr_6O_{11}$:$La_2O_3$ | 80:10:10 | 25 | 60:40 | 25 | 0.5 | |
| Example 9 | 2.0 | $ZrO_2$:$La_2O_3$ | 90:10 | 40 | 60:40 | 10 | 0.5 | |
| Example 10 | 2.0 | $ZrO_2$:$La_2O_3$ | 90:10 | 10 | 60:40 | 40 | 0.5 | |
| Example 11 | 2.0 | $ZrO_2$:$La_2O_3$ | 90:10 | 25 | 80:20 | 25 | 0.5 | |
| Example 12 | 2.0 | $ZrO_2$:$La_2O_3$ | 90:10 | 25 | 20:80 | 25 | 0.5 | |
| Example 13 | 1.0 | $ZrO_2$:$La_2O_3$ | 90:10 | 25 | 60:40 | 25 | 0.5 | 1.0 |
| Example 14 | 2.0 | $ZrO_2$:$Nd_2O_3$ | 99.5:0.5 | 25 | 60:40 | 25 | 0.5 | |
| Example 15 | 2.0 | $ZrO_2$:$Pr_6O_{11}$ | 40:60 | 25 | 60:40 | 25 | 0.5 | |
| Comparative Example 1 | 2.0 | | | | 60:40 | 50 | 0.5 | |
| Comparative Example 2 | 2.0 | $ZrO_2$:$La_2O_3$ | 90:10 | 50 | | | 0.5 | |

TABLE 2

| | 50% Purifying Temperature (° C.) | | Cross-Purifying Rate (%) | |
|---|---|---|---|---|
| | HC | $NO_x$ | HC—$NO_x$ | CO—$NO_x$ |
| Example 1 | 366 | 351 | 89 | 90 |
| Example 2 | 365 | 349 | 90 | 90 |
| Example 3 | 371 | 356 | 85 | 86 |
| Example 4 | 358 | 344 | 93 | 96 |
| Example 5 | 365 | 350 | 90 | 91 |
| Example 6 | 357 | 343 | 94 | 96 |
| Example 7 | 357 | 342 | 95 | 97 |
| Example 8 | 363 | 348 | 90 | 91 |
| Example 9 | 365 | 350 | 89 | 90 |
| Example 10 | 365 | 350 | 88 | 91 |
| Example 11 | 368 | 348 | 88 | 91 |
| Example 12 | 364 | 352 | 90 | 89 |
| Example 13 | 369 | 347 | 87 | 92 |
| Example 14 | 370 | 357 | 82 | 83 |
| Example 15 | 369 | 359 | 79 | 80 |
| Comparative Example 1 | 380 | 370 | 78 | 80 |
| Comparative Example 2 | 365 | 355 | 72 | 76 |

The invention claimed is:

1. A catalyst for purifying exhaust gases, comprising:
a catalyst support substrate;
a plurality of catalyst layers formed on a surface of the catalyst support substrate; and
an exterior-surface layer for forming a surface of the plurality of catalyst layers, wherein the exterior-surface layer includes:
a loading layer formed by at least one fireproof inorganic oxide;
a catalytic metal supported on the loading layer, the catalytic metal consisting of rhodium;
a stabilized zirconia loaded on the loading layer, the stabilized zirconia consisting of zirconia and an oxide formed by at least one additive member selected from the group consisting of yttrium, neodymium, praseodymium and lanthanum; and
a cerium-zirconium composite oxide loaded on the loading layer,
wherein:
the stabilized zirconia is present in an amount ranging from 50% to 95% by weight with respect to a total amount of cerium-zirconium composite oxide and the stabilized zirconia; and
the exterior-surface layer does not include platinum.

2. The catalyst for purifying exhaust gases as recited in claim 1, wherein the cerium-zirconium composite oxide is present in an amount ranging from 5 to 95% by weight with respect to a total amount of the cerium-zirconium composite oxide and the stabilized zirconia loaded on the loading layer.

3. The catalyst for purifying exhaust gases as recited in claim 1, wherein the at least one additive member is present in an amount ranging from 1 to 50% by weight with respect to a total amount of the stabilized zirconia.

4. The catalyst for purifying exhaust gases as recited in claim 1, wherein the cerium-zirconium composite oxide comprises at least one additive material selected from the group consisting of yttrium, neodymium, praseodymium and lanthanum.

5. The catalyst for purifying exhaust gases as recited in claim 1, wherein at least one layer within the plurality of catalyst layers comprises at least one compound selected from the group consisting of calcium, strontium, barium and lanthanum.

6. A catalyst for purifying exhaust gases, comprising:
   a catalyst support substrate;
   a plurality of catalyst layers formed on a surface of said catalyst support substrate; and
   an exterior-surface layer for forming a surface of the plurality of catalyst layers, wherein the exterior-surface layer includes:
   a loading layer formed by at least one fireproof inorganic oxide;
   a catalytic metal supported on the loading layer; the catalytic metal consisting of rhodium;
   a stabilized zirconia loaded on the loading layer, the stabilized zirconia comprising at least zirconia and praseodymium; and
   a cerium-zirconium composite oxide loaded on the loading layer, and
   wherein the exterior-surface layer does not include platinum.

7. The catalyst for purifying exhaust gases as recited in claim 6, wherein the amount of the praseodymium falls in a range of from 10 to 40% by weight with respect to the amount of the stabilized zirconia taken as 100% by weight.

\* \* \* \* \*